United States Patent [19]

Hashimoto et al.

[11] 4,351,097

[45] Sep. 28, 1982

[54] HYDRAULIC PLIERS FOR SNAP RINGS

[76] Inventors: Seiichi Hashimoto, 51,4-Chome, Nagata-Higashi, Higashi-Osaka-Shi, Osaka-Fu; Takaaki Aoki, Tamaebashi-Bldg., 3-36, 4-Chome, Nakanoshima, Kita-Ku, Osaka-Shi, both of Japan

[21] Appl. No.: 162,441

[22] Filed: Jun. 24, 1980

[30] Foreign Application Priority Data

Mar. 24, 1980 [JP] Japan ................................ 55/37271

[51] Int. Cl.3 ............................................ B23P 19/04

[52] U.S. Cl. ....................................... 29/229; 81/301; 81/302; 294/95

[58] Field of Search ................ 29/229, 225, 239, 252, 29/253; 81/301, 302, 443, 444; 72/453.03, 453.16, 453.14; 294/95, 97

[56] References Cited

U.S. PATENT DOCUMENTS 3,372,479 3/1968 Fischer ................................ 81/301

FOREIGN PATENT DOCUMENTS 617769 2/1949 United Kingdom ................. 81/302

882614 11/1961 United Kingdom ................. 81/301

*Primary Examiner*—James L. Jones, Jr.

*Attorney, Agent, or Firm*—Armstrong, Nikaido, Marmelstein & Kubovcik

[57] ABSTRACT

Hydraulic pliers useful for mounting and dismounting snap rings (otherwise called C-shaped stop rings) of large nominal diameter. They comprise a hand-holdable plier main body having working fluid contained therein, a hydraulic piston mechanism contained in the plier main body and adapted to be moved by hydraulic forces exerted by manual pumping operation effected by gripping action applied from outside, and a working-pin opening and closing mechanism mounted on a plier head for operative connection to the hydraulic piston and adapted to be opened or closed in the same plane and at right angles to the directon of movement of the hydraulic piston as the latter advances. The hydraulic pliers do not require any accessory equipment and are handy to carry. Thus, they are designed to expand or contract snap rings of large diameter lightly and efficiently by their hydraulic force.

8 Claims, 6 Drawing Figures

FIG. 3
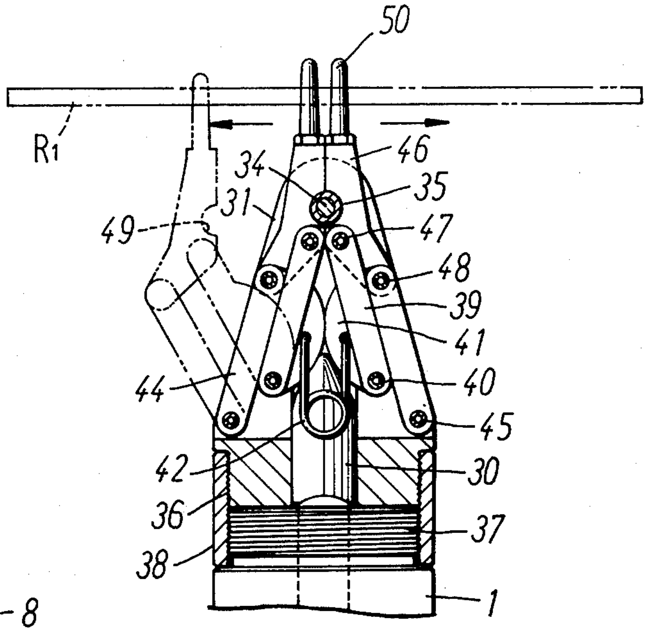
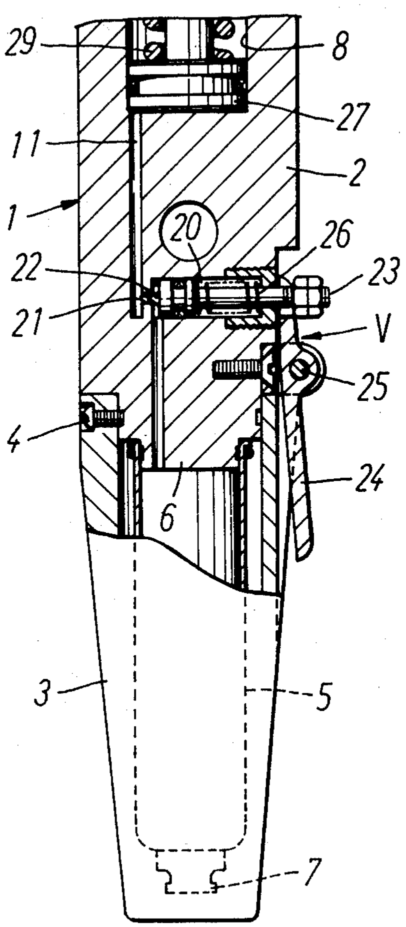
FIG. 4

HYDRAULIC PLIERS FOR SNAP RINGS

BACKGROUND OF THE INVENTION

The present invention relates to hydraulic pliers handy to carry and used for mounting and dismounting snap rings, especially of large nominal diameter, which, for the purpose of preventing the axial movement of bearings, collars and the like fitted on the shafts of various machines and instruments, are fitted in recessed peripheral grooves formed in the outer peripheral surface of said shafts or formed in the inner peripheral surface of shaft-engaging holes.

It is known in machinery fabrication that a snap ring is fixed in a projected manner on the peripheral surface of a shaft or of a shaft-engaging hole to thereby prevent the axial movement of a bearing, collar or the like mounted on the shaft. As otherwise called a C-shaped stop ring known in the art, such snap ring is usually opened at a part and is provided with sufficient elasticity to allow its opening and closing operation. For mounting and fixing such snap ring in position, it is temporarily expanded or contracted by utilizing its elasticity and forcefully fitted into a groove formed in the outer peripheral surface of a shaft or in the inner peripheral surface of a shaft-engaging hole.

That is, in the case of snap rings for use with shafts, since the inner diameter of the snap ring, adapted to fit the inner diameter of a recessed groove formed in the outer peripheral surface of a shaft, is, of course, smaller than the outer diameter of the shaft, when the ring is to be fitted in such groove it is required that the snap ring be temporarily and forcefully expanded and then be slid over the outer peripheral surface of the shaft until it reaches the recessed groove, whereat the hold upon the ring is released to restore its normal elasticity whereby the ring is tightly fitted in the groove. In the case of snap rings for use with holes, since the outer diameter of the ring, adapted to fit the inner diameter of a recessed groove formed in the inner peripheral surface of a shaft-engaging hole, is, of course, larger than the inner diameter of the hole, when the ring is to be fitted in such groove it is required that reversely, the snap ring be temporarily contracted and placed in the groove, whereat its elasticity is utilized to fix the ring in position. Thus, pliers (which may be referred to as ring setters) have been in wide use as a tool for practicing such operation. A conventional type of such pliers used particularly for large nominal diameter comprises a pair of opening and closing arms having working pins and pivotally connected together at a point in the form of a compass opend, a pair of operating handles respectively connected to said arms, one of said handles being integrally formed with a ratchet wheel, the other handle having a pawl attached thereto and normally elasticity urged into engagement with said ratchet wheel. With the working pins inserted in holes formed in the open ends of a snap ring, the user holds the handles with both hands to operate the handles so as to open and close the arms, so that with the degree of opening of the working pins being stepwise locked by the ratchet mechanism operatively associated with the opening and closing operation, the snap ring is forcefully deformed.

With such pliers, however, since the handles are long and must be held with both hands for operation, it is difficult to insert the working pins into the holes in the snap ring and in narrow places it is difficult to mount and dismount the snap ring with respect to said recessed peripheral groove. Further, since the deformation of the snap ring is attained solely by the user's force for opening and closing operation, much labor and time is expended in mounting or dismounting the snap ring. Further, since the pair of opening and closing arms are pivotally connected together at a point, the opening and closing motion of the working pins attained by the operation of the operating handles is an arcuate motion around the single pivot. Therefore, when the snap ring is being deformed, it is liable to warp and twist, while slippage is liable to occur between the holes in the ends of the snap ring and the working pins of the pliers. Thus, the operating force applied to the handles is not correctly and effectively transmitted to the snap ring.

On the other hand, unlike such manually operable opening and closing type, there is also known pneumatic pliers using compressed air force to open and close the working pins. With this type, although smooth operation and increased efficiency of operation can be attained, it is necessary to provide a compressed air source, such as a compressor, and piping, such as hoses, for introducing working air into the pliers, thus raising a problem that the pliers cannot be used in factories where there is no such accessory equipment. Another problem is that the presence of the piping puts limitations on working environment.

SUMMARY OF THE INVENTION

The present invention has been accomplished to eliminate the two problems exemplified by the pliers described above. A first object of the invention is to provide hydraulic pliers having a working fluid source contained therein, wherein a working fluid tank is contained in the plier main body, thus allowing the user to carry the pliers about him for use in any desired place without requiring accessory equipment.

A second object of the invention is to provide hydraulic pliers including a hydraulic piston mechanism installed in the plier main body, and a hand pump mechanism placed in a fluid passage which establishes the communication between the hydraulic cylinder and the working fluid tank, so that pumping operation performed with one hand holding the plier main body moves the hydraulic piston, which exerts a sufficient hydraulic force to expand or contract even a large snap ring lightly and efficiently.

A third object of the invention is to provide hydraulic pliers which are divided into two parts, namely, a plier main body and a plier head, said plier main body holding a working fluid tank, a hydraulic piston mechanism and a hand pump mechanism, said plier head being equipped with working pins and an opening and closing mechanism therefor, said two parts being separably assembled together to allow exchange of said plier head, thus enabling the pliers to be used for shaft-oriented or hole-oriented snap rings with an exchange made on the head side and facilitating maintenance and inspection of the pliers.

A fourth object of the invention is to provide hydraulic pliers, wherein the hydraulic piston mechanism and working-pin opening and closing mechanism are operatively connected together through contact between a drive cam attached to the front end of the hydraulic piston rod and driven cams attached to the working-pin opening and closing mechanism, said drive cam being removably attached to the piston rod so that partly because of the separable assembly of said plier main body and plier head, the drive cam is exchangeable, thereby allowing the change of the degree of opening of the working pins and the automatic control of the initial and subsequent operating forces for deforming the snap ring, and ensuring a smooth deforming operation in conformity with the snap ring size through exchange for a drive cam having a suitable working face configuration.

A fifth object of the invention is to provide hydraulic pliers, wherein the working-pin opening and closing mechanism is in the form of a symmetrical four-bar parallel link mechanism composed of a plurality of link pieces which are pivotally connected, in spaced opposed relation to each other, to the plier head at a plurality of pivotal points which do not cross each other, said mechanism being opened and closed by a working drive cam moving along the axis of symmetry, whereby the opening and closing motion of the working pins is made linear and uniform with respect to both working pins as much as possible, so as to prevent incorrect deformation of the snap ring, thereby ensuring effective transmission of the hydraulic operating force. Additionally, the link pieces are exchangeable.

A sixth object of the invention is to provide hydraulic pliers, wherein the symmetrical four-bar parallel link mechanism is held by a spring, which normally urges the driven cams of the working-pin opening and closing mechanism in a direction for contact with the drive cam of the hydraulic piston, thereby quickening the return motion of the hydraulic piston and the working pins.

Other objects of the invention will become apparent from the following description of preferred embodiments of the invention.

BRIEF DESCRIPTION OF THE DRAWINGS

FIG. 3 is a partial section taken along the line III—III of FIG. 2;

FIG. 4 is a partial section taken along the line IV—IV of FIG. 2;

DESCRIPTION OF THE PREFERRED EMBODIMENTS

Figure 1:
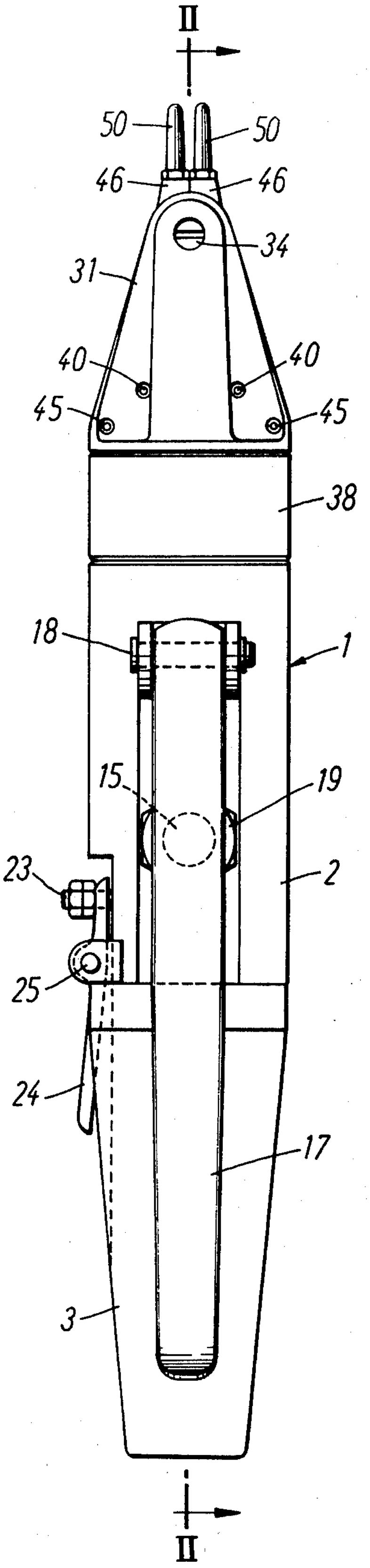
FIG. 1 is a complete external plan view of hydraulic pliers for shaft-oriented snap rings.
Figure 2:
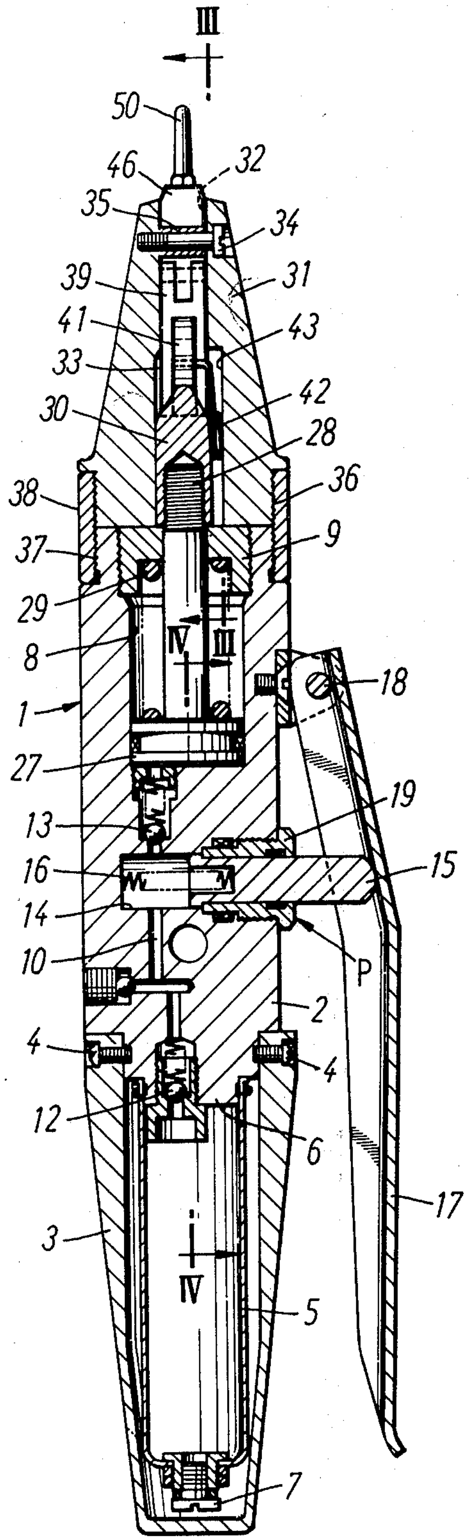
FIG. 2 is a complete section taken along the line II—II of FIG. 1.

FIGS. 1–4 illustrate hydraulic pliers for shaft-oriented snap rings according to the present invention. The numeral 1 denotes a plier main body, which, more particularly, is composed of an assembly of a body block 2 and a cover grip 3. The cover grip 3 is in the form of a hollow cylinder which is easily grippable and is fitted at its mouth portion on the base end of the body block 2 and removably attached thereto by a plurality of screws 4. The numeral 5 denotes a working fluid tank sealedly installed in the cover grip 3, with its mouth portion fluid-tightly fitted on the proximal end boss portion 6 of the body 2. The working fluid held in the tank is, of course, exchangeable. The numeral 7 denotes a closure plug for the working fluid tank, and 8 denotes a hydraulic cylinder defined in the front end portion of the body block 2 and having its front end closed by a screw plug 9. The numerals 10 and 11 denote a working fluid passage and a return fluid, respectively, which individually connect the cylinder 8 to the working fluid tank 5 and which, as is apparent from FIGS. 2 and 4, are formed in the body block 2.

The working fluid system, as shown in FIG. 2, includes check valves 12 and 13 disposed at the inlet and outlet ends, respectively, said check valves allowing only the passage of working fluid directed from the tank 5 to the cylinder 8. The numeral 14 denotes a plunger chamber defined in the working fluid passage 10 extending between the check valves 12 and 13 and the numeral 15 denotes a plunger disposed in said chamber 14. The plunger 15 and check valves 12 and 13 constitute a double action plunger pump mechanism P. The upper end of the plunger 15 normally projects outside the body block 2 under the action of a return coil spring 16. By manually operating a hydraulic operating lever 17 to push in the latter against the force of the spring 16, the working fluid in the plunger chamber 14 is pumped to the hydraulic cylinder 8. When the plunger 15 is returned to the original position by the coil spring 16, the working fluid in the tank 5 is drawn into the plunger 14. The numeral 18 denotes a pivot pin for supporting the operating lever 17, and 19 denotes a closure screw plug. In addition, the operating lever 17 is shown simply contacted with the upper end of the plunger 15, but they may be mechanically connected together.

The return fluid system, as is apparent from FIG. 4, includes a valve port 20 disposed in the return fluid passage 11.

A hole 21 is formed in the innermost region (bottom) of the valve port 21 and adpated to be opened and closed by the needle valve 22. The numeral 23 denotes an operating rod which integrally holds the needle valve 22. A fluid releasing lever 24 is attached to the upper end of said operating rod, outside the body block. In this embodiment, as can be seen in FIG. 1, the return fluid passage 11 and the working fluid passage 10 are positioned about 90 degrees out of phase with each other on the circumference of the body block 2, so that the hydraulic operating lever 17 and the fluid releasing lever 24 can be easily manipulated with one hand which holds the cover grip 3. The numeral 25 denotes a pivot pin for the fluid releasing lever 24, and the numeral 26 denotes a coil spring which normally urges the needle valve 22 to close the hole 21. The coil spring 26, hole 21 and operating rod 23 with the needle valve 22 constitute a fluid releasing valve mechanism V. If the fluid releasing lever 24 is manually operated to pull up the rod 23 against the force of the spring 26, the needle valve 22 opens the constricted hole 21, whereby the working fluid acting on the hydraulic cylinder 8 is released to return to the tank 5. In addition, so long as the fluid releasing mechanism V performs such function, it may be embodied in the form of a cock.

A hydraulic piston 27 is fitted in the hydraulic cylinder 8 and has a threaded shaft portion 28 at the front end thereof, said portion extending outwardly through the closure screw plug 9. Denoted at 29 is a coil spring for returning the piston 27, and the screw plug 9 is hollowed to serve as a retainer for said spring 29. A drive cam 30 is removably screwed on the threaded shaft portion 28 of the piston rod and has a wedge- or spindle-shaped working face. A plier head 31, as is apparent from FIG. 1, has a tapering appearance, substantially that of an isosceles triangle, as seen in a plan view. The plier head has a centrally and longitudinally extending slotted groove 32 for receiving links. The numeral 33 denotes a guide port formed in the base of the plier head for guiding the drive cam, said guide port communicating with the slotted groove 32. The numeral 34 denotes a fixing bolt set in the front end of the head 31 for holding a distance collar 35 in the slotted groove 32 so as to prevent undesirable deformation of the opening.

The plier head 31 is removably assembled to the body block 2. More particularly, as is apparent from FIGS. 2 and 3, their respective connecting portions have cut therein threads 36 and 37 of the same diameter, on which a coupling 38 is threadedly fitted. Thus, the plier head 31 may be removed for exchange by unscrewing it from within the coupling 38. Removal of the head 31 leaves exposed the drive cam 30 threadedly fitted on the front end portion of the rod of the piston 27, so that the head also can be easily removed for exchange.

Received in the slotted groove 32 in the plier head 31 is the following working-pin opening and closing mechanism operatively connected to the hydraulic piston mechanism in the body block 2.

In FIGS. 2 and 3, a pair of inner link pieces 39 disposed side by side in the slotted groove 32 are pivotally connected at their proximal ends to the plier head 31 by pivot pins 40. The pivot pins 40 are disposed at two apexes of an isosceles triangle lying on the opposite sides of the axis of the drive cam 30 with respect to the plier head 31 forming an isosceles triangle, as shown in FIGS. 1 and 3.

A pair of arcuate convex driven cams 41 extend from the inner surfaces of the inner link pieces 39. Fixedly inserted from above into the driven cams 41 are ends of a spiral spring 42 which constantly urges the inner link pieces 39 into their closed state so as to press the driven cams 41 tangentially against the drive cam 30. Thus, the inner link pieces 39 are interconnected and held by said spiral spring 42. The spiral spring 42 is received in a recess 43 in the upper surface of the slotted groove, so as not to interfere with the drive cam 30. As the inner link pieces 39 with the driven cams 41 are opened and closed, the spiral spring moves back and forth in the recess 43.

Denoted at 44 are a pair of outer link pieces which, together with the inner link pieces 39, form a four-bar parallel link mechanism and which are pivotally connected at their proximal ends to the plier head 31 by pivot pins 45.

A pair of top pieces 46 are pivotally connected at their proximal end to the distal ends of the inner and outer link pieces 39 and 44 by pivot pins 47 and 48, respectively. The proximal ends of the top pieces 46, when pivotally connected, are nipped by or engaged in the forked distal ends of the inner and outer link pieces 39 and 44, whereby the whole of the opening and closing mechanism is nested in the slotted groove 32 such that the pieces 39, 44 and 46 constituting the symmetical four-bar link mechanism are held in a closed and contacted state. The numeral 49 denotes a notch formed in the inner surface of each top piece 46 for clearing the distance piece collar, and 50 denotes a pair of working pins set in the distal ends of the top pieces 46 to extend parallel to each other and adapted to be inserted in holes (not shown) in a shaft-oriented snap ring R1 when used. In this case, if the working pins 50 are removably attached to the top pieces 46 as by screw means, this is more advantageous in that various snap rings can be easily handled by simply exchanging the working pins 50 each time. In addition, the same roll pins have been employed in the illustrated embodiment as the pivot pins 40, 45, 47 and 48.

In the pliers for shaft-oriented snap rings described above, as shown in solid lines in FIG. 3, the working-pin opening and closing mechanism comprising the top pieces 46 and inner and outer link pieces 39 and 44 is normally held in its closed and contacted state by the spiral spring 42 and the drive cam 30 on the hydraulic piston 27 faces correctly to the driven cams 41 in the closed state inwardly extending from the inner link pieces 39 on the axis of symmetry.

When the pliers are used to fit the shaft-oriented snap ring R1 to various machines or the like, the hydraulic operating lever 17 of the plier main body 1 is gripped and manually operated to press the plunger pump mechanism P, thus advancing the hydraulic piston 27 and the drive cam 30 under hydraulic pressure, whereby the drive cam 30 uniformly contacts the driven cams 41 of the inner link pieces 39 which are now in the closed state, outwardly pushing them apart against the force of the spiral spring 42. As a result, the inner and outer link pieces 39 and 44 are opened while executing parallel motion, so that the top pieces 46 are also likewise opened. Thus, the distance between the working pins 50 increases, as shown in phantom lines in FIG. 3. The amount of increase in the distance may, of course, be changed as desired by suitably selecting the working surface configurations of the drive and driven cams 30 and 41 contacting each other and the stroke of the hydraulic piston 27.

On the other hand, if the hydraulic pressure releasing valve mechanism V is actuated for release by gripping and manually operating the hydraulic pressure releasing lever 24 of the plier main body 1, the working fluid returns from the hydraulic cylinder 8 to the tank 5, allowing the hydraulic piston 27 and drive cam 30 to return, so that the opening and closing mechanism for the working pins 50 is restored to the closed state shown in solid lines in FIG. 3 by the force of the spiral spring 42. Such return motion is assisted by the coil spring 29 for returning the piston 27, in a quick return fashion. Therefore, by performing the above operation on the lever after inserting the working pins 50 into the holes in the open ends of the shaft-oriented snap ring R1, the snap ring R1 can be deformed under hydraulic pressure and fitted in a circumferential groove (not shown) formed in the outer peripheral surface of a shaft of various machines or it can be removed from such groove, in a smooth operation.

Figure 5:
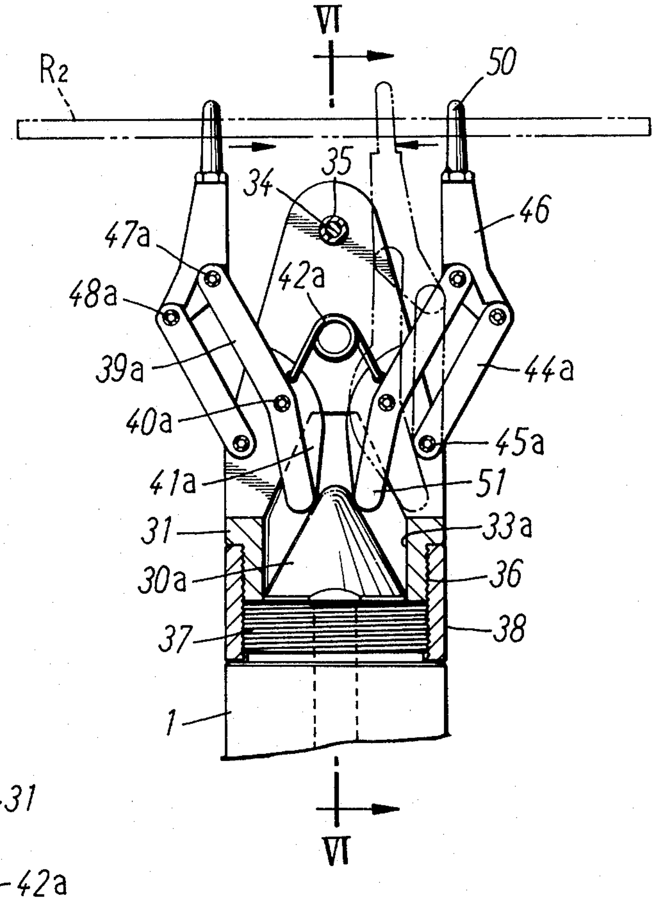
FIG. 5 is a partial section, showing a plier head for hole-oriented snap rings in its attached position corresponding to FIG. 3.
Figure 6:
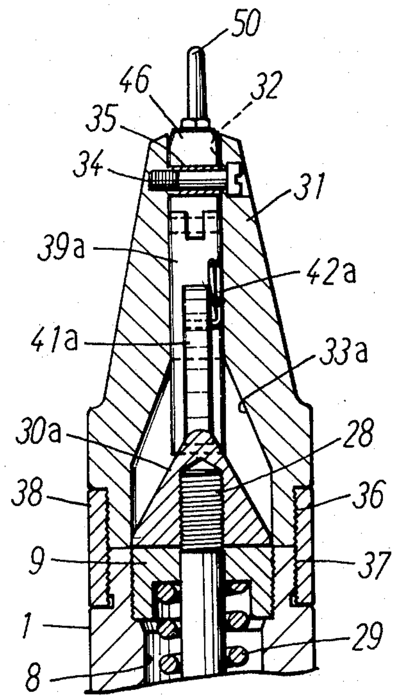
FIG. 6 is a partial section taken along the line VI—VI of FIG. 5.

FIGS. 5 and 6 show an example of the invention in the form of pliers for hole-oriented snap rings, such ring being shown at R2. In this case, the plier main body 1 containing the working fluid storage tank 5, plunger pump mechanism P and hydraulic piston mechanism, described in the preceding embodiment, is utilized as such, and the plier head 31 with the working-pin opening and closing mechanism installed therein, and the drive cam 30 are replaced by those shown in FIGS. 5 and 6.

The working-pin opening and closing mechanism for the shaft-oriented snap ring R2 is so designed that the pair of top pieces are normally urged into their opened state by a spiral spring **42*a* hooked up to the driven cams 41*a* of the inner link pieces 39*a* and will be closed, as shown in phantom lines in FIG. 5, by the forward movement of a drive cam 30*a* so as to reduce the distance between the working pins 50. To this end, the inner link pieces 39*a* are pivotally connected at their intermediate regions to the plier head 31 by pivot pins 40***a* and each formed with a power arm portion 51 rearwardly integrally extending from the pivoted region. The inner wall surfaces of the power arm portions 51 are designed as arcuate convex driven cams 41*a* adapted to contact the drive cam 30*a* on the front end of the hydraulic piston 27. The spiral spring 42*a* is disposed axially outwardly of the pivoted regions and hooked up to the driven cams 41*a* of the inner link pieces 39*a* so as to normally urge the power arms 51 equipped with the driven cams 41*a* in the closing direction.

In this case, the positioning of the spiral spring 42*a* axially outwardly of the intermediate pivoted regions to interconnect the inner pieces 39*a* serves to prevent the spiral spring 42*a* from interfering with the forward movement of the drive cam 30*a,* thus eliminating the need of providing the plier head 31 with spring clearing means, such as the recess 43 shown in FIGS. 1–4, and the spring 42*a* can be easily installed in the slotted groove 32 of the head 31. As compared with the drive cam shaped like a warhead as shown in FIGS. 1–4, the drive cam 30*a* is in the form of a cone of large diameter and a guide port 33*a* along which the drive cam 30*a* slides is formed in the mouth portion of the plier head 31 and communicates with the slotted groove 32. The rest of the arrangement is substantially the same as in FIGS. 1–4. Therefore, reference characters used in FIGS. 1–4 are also used in FIGS. 5 and 6 to indicate the corresponding parts, and a detailed description is omitted.

In the pliers for hole-oriented snap rings, as shown in solid lines in FIG. 5, the top pieces 46 are normally maintained in their opposed state by the action of the spiral spring 42*a,* with the power arm portions 51 of the inner link pieces 39*a* being closed and the drive cam 30*a* on the hydraulic piston 27 correctly facing to the driven cams 41*a* along the axis of symmetry. In use, therefore, in the same manner as described with reference to FIGS. 1–4, the hydraulic operating lever 17 is manually operated to advance the hydraulic piston 27 and drive cam 30*a* under hydraulic pressure, pushing apart the power arm portions 51 of the inner link pieces 39*a,* so that the link pieces 39*a* and 44*a* are moved toward each other in the closing direction. As a result, the distance between the working pins 50 is reduced, as shown in phantom lines in FIG. 5. Therefore, by inserting the working pins 50 into holes (not shown) in the hole-oriented snap ring R2 and operating the lever, as described above, it is possible to contract said snap ring and fit the latter in the recessed groove (not shown) formed in the inner peripheral surface of a shaft-engaging hole. Thus, the mounting and dismounting operation can be practiced smoothly. In addition, if the hydraulic fluid releasing lever 24 is operated, it goes without saying that the restoration of the working pins 50 to their original state can be achieved through the retraction of the hydraulic piston 27 in a quick return fashion, as in the case of FIGS. 1–4.

In either manner of use, the working-pin opening and closing mechanism for expanding or contracting the snap ring is arranged not such that the pivotal support means for opening and closing operation is provided by a single fulcrum at the intersection but such that by using pairs of pivot pins 40, 40*a* and 45, 45*a* for pivotally connecting the inner and outer link pieces 39, 39*a* and 44, 44*a* to the plier head 31, said pivotal support means is provided by a plurality of points opposed to each other on the opposite side of the axis of symmetry. As a result, the opening and closing motion of the working-pins 50 is substantially linear, so that the deformation of the snap ring does not become incorrect and slippage of the working-pins in the holes can be suppressed, thus ensuring effective transmission of the hydraulic operating force of the pliers to the snap ring and this, coupled with the suitable selection of the contact working surface configurations of the drive and driven cams 30, 30*a* and 41, 41*a* makes it possible to deform the snap ring correctly without fail.

As can be understood from the foregoing description, the present invention provides hand-holdable hydraulic pliers useful for mounting and dismounting highly elastic shaft-oriented or hole-oriented snap rings of large nominal diameters, which do not require any accessory equipment and which are handy to carry to any desired place, allowing the user to do his work efficiently with little labor expended.

What is claimed is:

1. Hydraulic pliers for snap rings having ends comprising:

- a hand-holdable main body having an end and a longitudinal axis;
- hydraulic pump means housed in the main body including a piston extendable along the axis towards the end of the main body;
- a cam head on the piston extending beyond the end of the main body;
- a plier head on the end of the main body, the cam head being extendable into a bore in the plier head, and
- a pair of parallelogram link means pivotally, symmetrically mounted on the plier head and coacting with the cam head for linearly moving engaged ends of a snap ring without axial movement of the main body, each link means including a straight working-pin for engagement with the ends of the snap ring.

2. The hydraulic pliers of claim 1 wherein each parallelogram link means comprises an inner link bar and an outer link bar, each bar having a first end portion and a second end, the first end portions of the both bars being pivotally mounted on the plier head, each inner link bar having an arcuate convex cam surface coacting with the cam head; and

- a top body carrying the working-pin parallel to the axis, the second ends of both bars being pivotally connected to the top body forming a parallelogram.

3. The hydraulic pliers of claim 2 wherein each inner link bar further includes a power arm portion extending from the first end portion, the power arm portion having the cam surface thereon.

4. The hydraulic pliers of claim 2 wherein the cam surface is positioned between the first end portion and the second end of each inner link bar.

5. The hydraulic pliers of claim 1 wherein the cam head is separably mounted on the piston.

6. The hydraulic pliers of claim 3 further comprising a spring connected to both inner link bars urging the pair of link means away from each other.

7. The hydraulic pliers of claim 4 further comprising a spring connected to both inner link bars urging the pair of link means towards each other.

8. The hydraulic pliers of claim 1 wherein the plier head is separably mounted on the main body.

* * * * *